United States Patent Office 3,764,457
Patented Oct. 9, 1973

3,764,457
TRANSPARENT, IMPACT-RESISTANT POLY(CAR-
BONATE-URETHANE) LAMINATES
Wen-Hsuan Chang, Gibsonia, Pa., and Andrew J. Kaman,
Norton, Ohio, assignors to PPG Industries, Inc., Pittsburgh, Pa.
No Drawing. Filed Aug. 2, 1971, Ser. No. 168,498
Int. Cl. B32b 17/10, 27/40
U.S. Cl. 161—183                                    31 Claims

ABSTRACT OF THE DISCLOSURE

Laminates for use as automobile windshields or other safety glass applications comprising a polycarbonate urethane and one or more sheets of glass are provided. The urethane is preferably a thermoplastic material formed from an aliphatic polycarbonate, a cycloaliphatic diisocyanate and a monomeric aliphatic diol.

---

This invention relates to laminated glass articles and more particularly to a laminated safety glass comprising a polycarbonate urethane adhered to at least one layer of glass.

Safety glass is a well known term for a glass sandwich composed of an interlayer bonding together two glass plates or sheets so that the breaking of the glass results in a minimum dispersion of fragments of broken glass. These laminated glasses are widely used in automobiles and must possess a number of properties among which are: (1) a high impact energy absorption level so as to minimize concussive injury; (2) a shear and tear strength sufficient to prevent rupture from the broken glass; (3) sufficient adhesion to the glass in order to inhibit laceration and prevent broken pieces of glass from flying and injuring anyone nearby; and (4) it must have good optical transparency.

One difficulty encountered in present day windshields is that upon breaking, sharp glass edges develop which can result in severe lacerative injuries. In order to avoid this type of injury, the glass laminate must have improved penetration resistance but this resistance must not be so great as to cause concussive injury. Moreover, the safety glass must possess these properties over a wide temperature range in which these materials are employed.

It has now been discovered that bilayer and multiple-laminates of one or more sheets of glass and particular urethane polymers can be employed to provide safety glass which are impact-resistant over a wide temperature range, cause little lacerative injury and are superior to safety glass using polyvinyl butyral interlayers commercially employed at the present time.

More particularly, the urethane polymer comprises segments formed from (a) a segment having polycarbonate linkages, i.e.

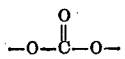

and a pair of groups reactive with isocyanate groups; (b) a diisocyanate, and (c) a compound containing at least two active hydrogens per molecule reactive with the diisocyonate. The components (a) and (c) can have primary or secondary amino groups, hydroxyl, mercapto groups, or other groups with active hydrogens but said components are of different molecular weight.

Polycarbonate urethanes herein contemplated, for example, are prepared from hydroxy-terminated polycarbonates with molecular weights usually ranging upwards of 1,000 and rarely exceeding 5,000 or less than 500 as determined by hydroxyl end group analysis and by the formula:

Molecular weight $$= \frac{\text{(functionality of polyol) (56.1) (1,000)}}{\text{OH Number}}$$

The proportions of ingredients will depend upon the particular ingredients employed and their molecular weight. For example, when the polycarbonate has a molecular weight of about 1,000, the ratio of active hydrogen compound, e.g., 1,4-butanediol per mole of polycarbonate will be between about 0.5 and 1.2. When, however, higher molecular weight polycarbonates such as about 2,000 are employed, the ratio can be between about 0.5 and about 5:1. When the polycarbonate has a molecular weight of about 3,300, the ratio of active hydrogen compound to polycarbonate can be between about 1:1 to 10:1 or more. When a laminate having low temperature properties is desired, the ratio of active hydrogen compound to polycarbonate can be still less or about 0.2:1 and when high temperature properties are desired the ratio can be still greater or about 12:1 or more.

An important criterion of a good interlayer composition is that it should be transparent at least when in the form of a thin sheet as it is used in the safety glass. It has been discovered that appropriately clear or haze-free interlayers are provided when the urethane reactants are made homogeneous and reacted at a temperature of 100° C. or above. In many cases, however, additional steps are necessary in order to obtain haze-free clear polymers. For example, some compositions made from high molecular weight polycarbonates such as 3,300 molecular weight are translucent, unless the reaction rates of the reactants are controlled to obtain a random distribution such as by use of a catalyst or by conducting the reaction at a higher temperature, as are some urethanes made with xylylene diisocyanate, and 4,4'-methylene-bis-(cyclohexyl isocyanate) in a stereoisomer ratio of 70 percent trans and 30 percent cis. One method to clarify these polymers is to heat the polymer to a temperature of between about 320° F. and about 375° F. such as by extrusion and then quench it in water, although in some cases the polymer may revert to its translucent state upon aging. In the case of the 4,4'-methylene-bis-(cyclohexyl isocyonate) of the aforesaid stereoisomer ratio, the reason that the resultant urethanes are often translucent is believed to be due to the fact that the larger amount of the more reactive trans isomer results in blocks of regular segments which cause opacity or translucence. A third way for obtaining clear polymers with these aforesaid diisocyanates is to use a branched structure or unsymmetrical low molecular weight diol as the active hydrogen compound, such as 1,3-butanediol, 1,4-cyclohexane dimethanol (mixture of cis and trans isomers) or Bisphenol A in place of the symmetrical diol such as 1,4-butanediol. Quite surprisingly, however, when the 4,4'-methylene-bis-(cyclohexyl isocyanate) is employed in a stereoisomer ratio of 55 percent trans to 45 percent cis, the most preferred 1,4-butanediol can be used as the active hydrogen compound and superior clear compositions obtained. Thus, the preferred diisocyanates are those in which a similar reaction rate with each of the other urethane-forming ingredients can be achieved at the reaction temperature desired, and particularly the aliphatic and cycloaliphatic diisocyanates which have nearly the same reactivity rate with both the polycarbonates and low molecular weight aliphthaic diols. Most preferred are the cycloaliphatic diisocnayates, such as 4,4'-methylene-bis-(cyclohexyl isocyanate) in a stereoisomer ratio of 55 percent trans and 45 percent cis, which are a liquid at room temperature (30° C.).

Urethanes made with other diisocyanates such as toluene diisocyanate and methylene diphenyl diisocyanate are less preferred as these compositions: do not normally have as good impact energy absorption levels, they are more subject to ultraviolet light deterioration such as when employed in a bilayer and not protected on both sides by glass, and also they are not as thermally stable and, thus, in some cases may be partially decomposed during the forming operations so that they are somewhat restricted in the methods by which they can be treated. The polycarbonate urethanes made from aliphatic and particularly cycloaliphatic diisocyanates, however, are not adversely affected by ultraviolet light nor are they adversely affected by conventional processing temperatures. For example, the most preferred urethanes prepared from polyoxyalkylene carbonates, 1,4-butanediol, and 4,4'-methylene-bis-(cyclohexyl isocyanate) in a stereoisomer ratio of 55 percent trans and 45 percent cis when subjected to a Dupont thermo gravimetric analyzer at a temperature of 200° C. show no decomposition after 12 hours.

Although not intending to be bound by this explanation, it is believed that the unusual energy absorption properties and transparency are not only dependent upon the urethane ingredients and proportions but on the method of preparation. More particularly, it is believed that the presence of polyurethane regular block segments adversely bears upon the polyurethane's transparency and energy absorption properties and consequently it is believed that a random polymer is necessary for optimum results. Consequently whether the urethane contains random or regular block segments depends upon the particular reagents and their relative reactivity as well as the conditions of reaction. Generally speaking, the diisocyanate will be more reactive with the low molecular weight active hydrogen compound, e.g., butanediol, than the hydroxy-terminated polycarbonate and, hence, care is required to inhibit the preferential reaction between the butanediol and the diisocyanate such as by rapidly adding the diisocyanate to an intimate mixture of the butanediol and polycarbonate with vigorous agitation preferably at at temperature of at least about 100° C. when no catalyst is employed and then maintaining the temperature of the reaction at at least about 130° C. after the exotherm has subsided. Inasmuch as the polyurethanes are thermally stable, however, reaction temperatures can reach as high as 200° C. particularly for the most preferred polycarbonate urethanes; and as low as about 70° C. When a catalyst is employed, lower reaction temperatures can be employed because the catalyst accelerates the reaction. A preferred temperature range is between about 80° C. and about 150° C. when a catalyst is employed and more preferably between about 80° C. and about 100° C. When no catalyst is employed, the reaction temperature is preferably between about 130° C. and 150° C.

It is also important to rapidly attain reaction temperatures after a homogeneous mixture is obtained, when a catalyst is not employed so that the polymer does not become hazy. For example, it has been found that some mixtures become hazy in less than a half-hour at 100° C. Thus, it is important either through the use of a catalyst or by introducing the reactants at the reaction temperature such as by use of a mixing head to rapidly reach the reaction temperature such as above about 130° C. so that the polymer does not become hazy.

The urethane ingredients are preferably mixed in a moisture-free atmosphere, such as nitrogen, to prevent moisture contamination. When the reaction is conducted without a catalyst, an oxygen-free atmosphere is also preferably employed to prevent any surface discoloration of the urethane which occurs because of the longer reaction times.

These preferred polyurethanes are preferably prepared by the one-step or bulk polymerization method which provides a flexible polymer having a more random distribution of segments. The total number of hydroxyl groups or labile hydrogen atoms is approximately equivalent to the number of isocyanate groups and preferably a slight excess of hydroxyl groups of up to about 10 percent is employed.

The isocyanate reaction is preferably conducted under anhydrous conditions with dry reactants such as in a nitrogen atmosphere at atmospheric pressure and at a temperature between about 70° C. and about 180° C. until the polymer formation is essentially complete and the polyurethane is substantially free of isocyanate groups, i.e., has less than 0.6 weight percent isocyanate groups. The isocyanate content in the polymer will preferably be less than about 0.3 by weight percent. The polycarbonates are dried before reaction usually to a moisture content of between about 0.01 to 0.05 percent. To obtain the randomness desired and a clear leathery polymer, the active hydrogen compound, e.g., anhydrous butanediol (containing a maximum of 0.04 percent water) is preferably added to the polycarbonate under a nitrogen atmosphere to exclude the moisture and the temperature maintained sufficiently high so that there is no phase separation and a homogeneous mixture is obtained. The diisocyanate, e.g., 4,4'-methylene-bis - (cyclohexyl isocyanate), is then preferably added rapidly, and the temperature of the mixture maintained above about 100° C. so that there is no phase separation and the mixture remains homogeneous. The mixture is then preferably vigorously agitated at a temperature of at least about 100° C. and degassed for a period of at least about 3 minutes during which time the pressure is reduced from atmospheric to about 3 millimeters of mercury. The reduction in pressure facilitates the removal of the dissolved gases such as nitrogen and carbon dioxide, and then the ingredients are preferably reacted at a pot temperature of between about 120 and 150° C. (e.g., 143° C.) in the presence of a catalyst and the reaction continued for at least about one-half hour until there is substantially no isocyanate groups. In lieu of a catalyst, the reaction can be conducted for at least about 10 hours, preferably under a nitrogen atmosphere. The resultant semi-solid polymer is then preferably cut while warm, granulated, extruded, and/or milled and calendered into sheets and assembled into laminates and aged for several days to a week at room temperature.

Polymers having the desired random distribution can also be prepared by the prepolymer method when the polycarbonate is treated with an excess of that required to end-cap it or more than 2 moles of diisocyanate per mole of polycarbonate. Generally about 3 moles of diisocyanate per mole of polycarbonate are required or preferably 4 moles or more. Then the active hydrogen compound can be reacted with the prepolymer.

The preferred aliphatic polycarbonates are exemplified by Stevens, U.S. Nos. 3,248,414; 3,248,415 and 3,248,416. These essentially linear aliphatic polycarbonates are comprised of a multiplicity of carbonate and ether linkages terminated by hydroxyl groups. These patents (herein incorporated by reference in their entirety) teach the preparation of polycarbonates form: (1) carbon dioxide and 1,2-epoxides; (2) cyclic carbonates such as ethylene carbonate, or (3) from cyclic carbonates and a 1,2-epoxide. A minor amount of a polyol is employed as an initiator. The reaction is usually conducted under pressure in the presence of a metal carbonate, metal hydroxide, tri-sodium phosphate or a tertiary amine.

A typical polycarbonate hereby provided using ethylene oxide as the 1,2-epoxide may be represented by this structural formula:

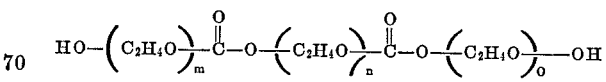

wherein subscripts $m$, $n$, $o$, etc., are positive whole integers of 1 or more. The repeating polyethylene oxide units $(CH_2-CH_2-O)$ may vary in length. Hence, subscripts $m$, $n$, $o$, etc., may represent different whole positive integers of 1 or greater. Usually, these repeating units are such that the subscripts are no greater than 8. The number of carbonate units,

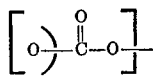

in these polycarbonate range from 2 to 20, more usually however the molecule has from 3 to 10 such units. With a different 1,2-epoxide, the repeating units separated by carbonate groups will correspond to ethers and polyethers of the epoxide.

The epoxides which can be reacted with carbon dioxide include: ethylene oxide, propylene oxide, or like olefinically saturated and unsaturated aliphatic 1,2-epoxides of up to and including 5 carbon atoms. Such compounds are often referred to as oxiranes. Other branched epoxides can be used such as 4-vinyl cyclohexene monoxide. Mixtures can also be employed but ethylene oxide is the preferred oxide.

Exemplary of initiators useful in preparing the polycarbonates of the aforesaid Stevens' patents include diols of the structure HO—R—OH wherein R is an alkylene radical of at least 2 carbons up to 25 or more, such as ethylene glycol, diethylene glycol, triethylene glycol, propylene glycol and dipropylene glycol, or even water can be employed. The polyols preferably have from between 2 and about 10 carbon atoms; and preferably not more than about 4 hydroxyl groups. The compounds with more hydroxyl groups such as sugars tend to result in discoloration and best results have generally been found with diols having no ether linkages such as ethylene glycol and propylene glycol and more preferably the former. Exemplary of suitable triols are glycerol, trimethylolethane and trimethylolpropane. A suitable tetrol is pentaerithrytol. Also cycloaliphatic diols such as 1,3-dihydroxy cyclopentane and aromatic dihydroxy compounds such as catechol, bisphenols, and xylene glycols are useful. Beside polyols, however, other organic compounds having at least 2 active hydrogens, usually from 2 to 4, can be employed. By active hydrogen is meant, a hydrogen linked directly to a nitrogen, sulfur or oxygen atom such as is found in hydroxy, non-tertiary amino, mercapto, and carboxyl groups. These include polyamines, mercaptans, alkylolamines, and the like, such as are illustrated in column 6 of U.S. Pat. 3,248,415.

Conventional reaction ratios and conditions can be employed such as, for example, 1 to 6 moles of alkylene oxide per mole of carbon dioxide, and a polyol in an amount sufficient to give between 0.01 to 0.2 mole per mole of ethylene oxide when a polycarbonate low in carbonate linkages is desired having a molecular weight between about 750 and about 5,000. When more carbonate linkages are desired, an alkylene carbonate such as ethylene carbonate can be reacted with a polyol such as ethylene glycol in a carbonate to glycol mole ratio in the range of 1.2:1 to 2.5:1 with removal of ethylene glycol.

The temperature of the reaction will vary from between about 160 and about 300° C.

Polycarbonates encompassed herein can be made by several known methods. For example, aliphatic diols can be reacted with bischloroformates of aliphatic diols in the presence of inert solvents and acid acceptors, e.g., tertiary amines. By this method, polycarbonates can be prepared without ether linkages. Other methods are disclosed in Sears (U.S. Pat. 3,186,961) and Bissinger et al. (U.S. Pat. 3,215,668).

In addition, polycarbonates can be prepared from glycols such as ethylene, propylene and diethylene glycols and dialkylcarbonates such as diethyl carbonate and dimethyl carbonate, by a transesterification reaction. Aromatic carbonates such as di-phenyl carbonate can also be employed.

The polycarbonate cannot contain, however, more than a minor amount of cycloaliphatic or aromatic linkages as these materials are too rigid for use as interlayers in safety glass. They can be employed, however, in bilayer laminates, e.g., adhered to a single layer of glass or in any laminate where the aromatic polycarbonate urethane is subject to the initial impact. For trilayers, e.g., the urethane sandwiched between two layers of glass, the polycarbonate must be essentially linear aliphatic.

In addition, the preferred polycarbonates of the invention will generally contain other non-hydrocarbon linkages and particularly ether linkages in a ratio of ether-to-carbonate linkages of about 2:1 to 10:1, preferably 3:1 to 6:1, and preferably a $CO_2$ content of between about 10 and about 20 percent by weight of the polycarbonate.

In addition to the preferred 4,4'-methylene-bis(cyclohexyl isocyanate), other dinuclear cyclic aliphatic diisocyanates are preferred which are joined through an alkylene group of from 1 to 3 carbon atoms, inclusive, and which can be substituted with nitro, chlorine, alkyl, alkoxy and other groups which are not reactive with hydroxyl groups (or active hydrogens) providing that they are not so positioned to render the isocyanate group unreactive. Exemplary of a preferred dinuclear cyclic aliphatic diisocyanate is 4,4'-isopropyl-bis-(cyclohexyl isocyanate). Mono nuclear cycloaliphatic diisocyanates are also useful such as 1,4-cyclohexyldiisocyanate.

In addition to the most preferred 1,4-butanediol, other preferred active hydrogen compounds are the aliphatic diols of from 2 to 15 carbon atoms inclusive, exemplary of which preferred compounds are: ethylene glycol, 1,3-propanediol, 1,3-butanediol, 1,6-hexanediol, 1,8-octanediol, 1,10-decanediol, and unsaturated diols such as 2-butene-1,4-diol and 2-butyne-1,4-diol and the like, which diols preferably contain the hydroxyl groups in a terminal position.

Generally the polycarbonates will have an average molecular weight between about 750 and 3,300, the diisocyanates between about 172 and about 300 and the active hydrogen compound between about 62 and about 250. When the materials are employed within the aforesaid molecular weight ranges, the resultant polyurethane will contain (calculated from the weight percentage of ingredients) by weight from between about 40 and about 80 percent and preferably between about 50 and about 70 percent polycarbonate, and between about 10 and about 60 percent and preferably from between about 20 and about 40 percent diisocyanate and, if at all, from between about 3 and about 25 and preferably from between about 5 and about 15 percent active hydrogen compound. When, however, polymers such as the polyoxypropylene diamines are employed as the active hydrogen compound, they can be employed in amounts approaching that of the polycarbonate. The polycarbonates can contain other than carbonate segments and they can be mixed with other polymers such as, for example, polyethers, polyesters, polyamides, polysiloxanes, poly unsaturated hydrocarbons, and the like, as well as mixtures. These other polymers can be hydroxy, amino, or mercapto terminated. The preferred urethanes are thermoplastic and, thus, essentially linear ingredients are preferred although tri-functional ingredients can be employed in minor amounts up to about 10 percent by weight of the resultant polymer and a thermoplastic urethane obtained.

The polycarbonates employed in the preparation of the urethanes of the invention are preferably hydroxy-terminated. A catalyst, if employed for the polycarbonate preparation, is used only in a minor amount so as not to alter materially the subsequent urethane reaction. If desired, special precautions can be taken to remove the catalyst from the polycarbonate prior to polyurethane formation. Useful polycarbonates are easily prepared by methods well documented in the literature.

The urethanes employed in the laminates of the invention are preferably made in a one-step bulk polymerization method so that a random block polymer is obtained and because it is the easiest and cheapest method.

DIISOCYANATES

In addition to the most preferred cyclic aliphatic diisocyanates, straight chain aliphatic diisocyanates such as 1,4-tetramethylene diisocyanate, 1,6-hexamethylene diisocyanate, 1,10-decamethylene diisocyanate, and hexamethylene adipamide diisocyanate can be employed. Suitable aromatic diisocyanates include the mononuclear types such as 2,4-toluene diisocyanate, 2,6-toluene diisocyanate, and the commercial mixtures comprising 80 percent 2,4-toluene diisocyanate and 20 percent 2,6-toluene diisocyanate; as well as the 65/35 mixture; and m-phenylene diisocyanate; dinuclear aromatic diisocyanates such as 4,4'-diphenylene diisocyanate and 1,5-naphthalene diisocyanate; halogen substituted aromatic diisocyanates such as 4-chloro-1,3-phenylene diisocyanate; alkyl substituted diisocyanates such as 3,3'-dimethyl-4,4'-diphenylene diisocyanate, the xylene diisocyanates including 1,3-xylene diisocyanate and 1,4-xylene diisocyanate and the durene isocyanates such as 2,3,5,6-tetramethyl-1,4-diisocyanate; aromatic-cycloaliphatic diisocyanates such as 1,5-tetrahydronaphthalene diisocyanate; polynuclear aromatic diisocyanates bridged through aliphatic groups such as diphenyl methane diisocyanate (MDI), and diphenyl isopropylidene diisocyanate; alkoxy substituted aromatic diisocyanates such as dianisidine diisocyanate; mononuclear aralkyl diisocyanates such as xylylene diisocyanates and particularly the 70/30 meta, para isomer mixture; aliphatic branched chained diisocyanates such as 2,2,4-trimethylhexamethylene diisocyanate (TMDI); and ester containing aliphatic diisocyanates such as 2,6-diisocyanato methyl caproate (lysine diisocyanate). In addition, the sterically hindered types such as 3,5-diethylmethylene-bis-(4-phenylene isocyanate), 3-isocyanato methyl-3,5,5-trimethylcyclohexyl diisocyanate (IPDI) and 2,6-diethyl-1,4-phenylene diisocyanate, in which the two isocyanate groups differ greatly in reactivity can also be employed. In addition, the corresponding cycloaliphatic diisocyanates, prepared by hydrogenating the the aromatic compounds herein, can be employed, such as, for example, hydrogenated toluene diisocyanate. Dinuclear diisocyanates in which one of the rings is saturated and the other unsaturated can be employed which are prepared by partially hydrogenating aromatic diisocyanates such as diphenyl methane diisocyanate, diphenyl isopropylidene diisocyanate and diphenylene diisocyanate. In addition, diisocyanates can be employed which are bonded through sulfonyl groups such as 1,3-phenylene disulfonyl diisocyanate, and 1,4-xylyene disulfonyl diisocyanate. Mixtures of diisocyanates can also be employed particularly mixtures of the preferred cycloaliphatic diisocyanates such as methylene-bis-(4-cyclohexyl isocyanate) with the commercial isomer mixtures of toluene diisocyanates or m-phenylene diisocyanate. In addition, monoisocyanates with sulfonyl chloride groups can be reacted with unsaturated organic compounds by a simple addition reaction to form high molecular weight diisocyanates. These are described by Oertel et al. in Polymer Preprints ACS Div. of Polymer Chem., September 1968, vol. 9, No. 2, pages 1520–7.

ACTIVE HYDROGEN COMPOUNDS

In addition to the preferred aliphatic diols exemplified by 1,4-butanediol, other compounds can be employed having at least two (preferably only two active hydrogens per molecule as determined by the Zerewitinoff test as described by Kohler in J. Am. Chem. Soc., 49 3181 (1927). Accordingly, active hydrogens include hydrogen atoms attached to oxygen, nitrogen, or sulfur, and thus useful compounds will include those having at least two of these groups (in any combination) —OH, —SH, —NH, —NH$_2$—COOH, —CONH$_2$, —SO$_2$OH,

—SO$_2$NH$_2$ and —CONHR wherein R is an organic radical. The compounds attached to each group can be aliphatic, aromatic cycloaliphatic, or of a mixed type. Preferred are the saturated aliphatic diols having from 2 to 15 carbon atoms such as ethylene glycol, 1,3-propanediol, 1,4-butanediol, 1,3-butanediol, 1,6-hexanediol, 1,8-octanediol, 1,10-decanediol; and unsaturated aliphatic diols such as the butene and butyne diols and particularly 2-butene-1,4-diol, 2-butyne-1,4-diol, 1,2-cyclohexenediol, 1,3-cyclohexenediol and mixtures. Diols in which the organic radical is interrupted by a chalcogen can be employed such as diethylene glycol or diethylene thioglycol. Also useful are cycloaliphatic diols such as 1,4-cyclohexane dimethanol, mononuclear aromatic phenols such as resorcinol, and the bis-beta-hydroxy ethyl ether of hydroquinone; aromatic polynuclear diols which are preferably bridged by an alkylene radical of from 1 to 3 carbon atoms such as 4,4'-dihydroxy diphenyl dimethyl methane (Bisphenol A) and 4,4'-dihydroxy diphenyl methane; and the corresponding polynuclear aliphatic compounds. Aminoalcohols, diamines, sulfonamides, mercapto terminated derivatives and mixtures, and the like, can be employed. Exemplary of suitable mixed types are: monoethanolamine, 4-aminobenzoic acid, 4-aminobenzamide, sulfanilamide, aminopropionic acid, 4-hydroxybenzoic acid, p-aminophenol and beta-hydroxypropionic acid. Suitable sulfonamide include: 1,3-propane-disulfonamide, 1,4-cyclohexane-disulfonamide, and 1,4-butanedisulfonamide.

ACTIVE HYDROGEN COMPOUNDS

Amines

The amines which can be employed in the preparation of the urethanes of the invention can be primary or secondary diamines in which the radicals attached to the nitrogen atoms can be saturated or unsaturated, aliphatic, alicyclic, aromatic, aromatic-substituted aliphatic, aliphatic-substituted aromatic or heterocyclic. Mixed amines in which the radicals are different such as, for example, aromatic and aliphatic can be employed and other non-reactive groups can be present attached either to carbon atoms or nitrogen atoms, such as oxygen, sulfur, halogen, or nitroso. Exemplary of suitable aliphatic and alicyclic diamines are the following: 1,2-ethanediamine, 1,2-propanediamine, 1,3-propanediamine, 1,3- butanediamine, 1,4-butanediamine, 1,5-pentanediamine, 1,6-hexanediamine, 1,8-octanediamine, diaminopropyltetramethylenediamine, 1,8-methanediamine, isophoronediamine, bis-(4-aminocyclohexyl)-propane-(2,2) and bis-(4-aminocyclohexyl)-methane.

Aromatic diamines such as the phenylene diamines and the toluene diamines can be employed. Exemplary of the aforesaid amines are: o-phenylenediamine, m-phenylenediamine, p-phenylenediamine, 4-m-tolylenediamine, and p-tolylenediamine, N-alkyl and N-aryl derivatives of the above amines can be employed such as, for example, N,N'-dimethyl-o-phenylenediamine,
N,N'-dimethyl-m-phenylenediamine,
N,N'-diphenyl-m-phenylenediamine,
N,N'-di-p-tolyl-m-phenylenediamine,
N,N'-di-2-naphthyl-m-phenylenediamine,
N,N'-dimethyl-p-phenylenediamine,
N,N'-diethyl-p-phenylenediamine,
N,N'-di(sec-butyl)-p-phenylenediamine,
p-aminodiphenylamine,
N,N'-diphenyl-p-phenylenediamine and
N,N'-di-2-naphthyl-p-phenylenediamine.

Polynuclear aromatic diamines can be employed in which the aromatic rings are attached by means of a valence bond such as, for example, 4,4'-biphenyldiamine and 3,3'-dimethyl-4-biphenyl diamine.

Other amines which can be employed contain the group:

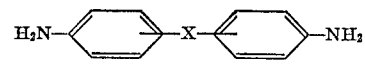

wherein X is a radical, such as: —O—, —S—, the group

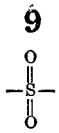

or a hydrocarbon radical or substituted divalent hydrocarbon radical which rarely contains more than 8 carbon atoms linking the two aniline groups

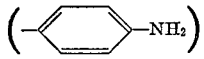

together. Some of these materials are prepared, as is understood by the art, by condensing aniline with an aldehyde, such as formaldehyde, acrolein, butyraldehyde, and like aldehydes containing up to about 8 carbon atoms, or a ketone such as acetone, methyl ethyl ketone, or like ketones containing up to about 8 carbon atoms. Some of these compounds are in monomeric form, others are in more complex polymeric form and contain two or more imino or amino groups (preferably two):

Where X is a

radical, the compounds are diaminodiphenyl sulfones, the simplest member of which is p,p'-diaminodiphenyl sulfone. Other diaminodiphenyl sulfones include 3,3'-diaminodiphenyl sulfone, 4,4'-diamino-3,3'-dichlorodiphenyl sulfone, 3,4'-diamino-3,4'-dichlorodiphenyl sulfone and like diamino sulfones containing other substituents on the phenyl nuclei including 1 to 4 carbon: alkyl, alkoxy, and alkenyl groups, most notable of which are the methyl and methoxy substituents. Exemplary of suitable secondary amines containing sulfone groups are the following:

N,N'-dimethyl-4,4'-diaminodiphenyl sulfone,
N,N'-dimethyl-4,4'-diamino-3,3'-dichlorodiphenyl sulfone,
N,N'-diethyldiaminodiphenyl sulfone,
N,N'-diethyl-4,4'-diamino-3,3'-dichlorodiphenyl sulfone,
N,N'-methylethyl-4,4'-diaminodiphenyl sulfone,
N,N'-dimethyl-3,4'-diamino sulfone,
N,N'-dimethyl-3,3'-diamino-4,4'-dichlorodiphenyl sulfone, and the like, including other diaminodiphenyl sulfones having from 1 to 4 ring substituents on each phenyl nucleus. Among such substituents are the halogens most notably chlorine, alkyl, alkoxy and alkenyl, usually of from 1 to 4 carbon atoms, exemplified by methyl and ethyl; methoxy, ethoxy and 2-chloroethoxy; allyl and vinyl groups. Polyfunctional materials can also be employed when crosslinking is desired and particularly trifunctional polyols such as triethanol amine, trimethylol propane, trimethylol heptane, trimethylol octane, castor oil, polyether polyols, polyester polyols, nitrogen-containing polyols such as, for example, the reaction products of alkylene oxides with urea or similar compounds, and others.

Other polymers which can be employed

As indicated heretofore, a key component to the polycarbonate urethane is an active hydrogen terminated polycarbonate. A minor portion of this requisite polycarbonate can be replaced by other polymeric components, e.g., a mixture of polyester and polycarbonate can be used.

In addition, other active hydrogen-terminated polymers can be employed which includes: polyethers, polyamides, polysiloxanes, unsaturated hydrocarbons, and the like, as well as mixtures. These other polymers are generally not employed in amounts to provide more than a total amount of about 45 percent by weight of the polycarbonate and preferably from between about 10 and about 30 percent by weight of the polycarbonate.

Exemplary of suitable polyethers are the poly(oxypolymethylene) glycols such as disclosed in Wismer, U.S. Pat. 3,509,015, such as, for example, poly(oxytetramethylene) glycol, polyethylene glycol, and poly(1,2-propylene) glycol.

Exemplary of suitable polyesters are those prepared from aliphatic diols of from 2 to 15 carbon atoms such as, for example, ethylene glycol, 1,3-propanediol, 1,3-butanediol; and dicarboxylic acids such as adipic, suberic, sebacic, and azelaic acids. Particularly preferred is poly(1,4-butylene adipate). Polyesters can be employed, however, formed from cycloaliphatic and aromatic components such as 1,4-cyclohexanedimethanol, Bisphenol A, terephthalic acid, and 4,4'-isopropylidene-dibenzoic acid.

Exemplary of suitable polyamides which can be employed are: the condensation products of dibasic acids with diamines such as ethylene diamine, particularly wherein the dibasic acids are azelaic, adipic, suberic, sebacic, or dimer acids from vegetable oils such as soybean, cottonseed, and corn.

Hydroxy-terminated polysiloxanes can be employed. For example, linear polysiloxanes having the repeating units—$R_2SiO$—wherein the R groups are organic radicals and preferably methyl or phenyl can be employed. Silicon atoms can also be incorporated into the bodies of other polyols such as polyesters and polyamides by reacting an organic chloro silane with said polyols. By a similar method, silicon atoms can be incorporated into the low molecular weight diols.

Exemplary of suitable unsaturated hydrocarbons are the mercapto and hydroxy-terminated: poly(butadiene), poly(butadiene-acrylonitrile) copolymers, and poly(butadienestyrene) copolymers. Most of the polymers are commercially available but those that are not can be prepared by methods well documented in the literature.

The urethanes for the laminates of the invention can be prepared in several ways. The prepolymer method offers selective control of the polymerization steps. By this method, the polycarbonate is first reacted with an excess of diisocyanate to give an intermediate molecular weight adduct or "prepolymer." The prepolymer can then be polymerized (chain-extended) with glycols, diamines, or other active hydrogen compounds. A thermosetting or crosslinked material can be obtained by the use of some triol or other trifunctional material in the curing step or crosslinks may be obtained by regulating the ratio of prepolymer to active hydrogen compound so that a slight excess of NCO is present.

In addition to the prepolymer route where the reaction of isocyanate with polycarbonate is completed before the active hydrogen compound (alternatively referred to herein as "curing agent") is added, all components may be mixed simultaneously in a so-called "one-step" process as previously discussed with the most preferred compositions. This method is generally satisfactory when all active hydrogens react at about the same rate such as when all contain hydroxyl groups as the only reactive sites. When a diamine active hydrogen curing agent is included, however, the procedure is usually successful only if special catalysts are added to selectively catalyze the reaction with hydroxyl groups so that their reactivity becomes similar to that of the amine groups. Otherwise, the diamine reacts first forming a polyurea which separates from the reaction mixture. Particularly useful catalysts are the tin catalysts such as dibutyl tin dilaurate and stannous octoate.

For optimum results, the water content of the hydroxyl-terminated reactants should be as low as possible.

The isocyanate reaction should generally be conducted under anhydrous conditions with dry reactants, such as in a nitrogen atmosphere, at atmospheric pressure and at a temperature of between about 70° C. and about 200° C. The reaction is conducted until there is essentially no free isocyanate or hydroxyl groups (i.e., less than about 0.6 percent and preferably less than 0.3 percent by weight NCO.)

Catalyst although not required for all reactions are preferably employed such as, for example, the aforementioned tin catalysts: dibutyl tin dilaurate and stannous octoate. UV absorbers, such as 2,4-dihydroxy benzophenone and Tinuvin P (TM of Geigy Chemical Corp. for a substituted benzotriazole) are preferably employed for the aromatic diisocyanates but are generally not rerequired for the more stable aliphatic diisocyanates. Thermal stabilizers may be required for some of the compositions such as, dilauryl thiodipropionate and the hindered phenolics.

The processing conditions which may be used and the final polymer properties will govern the choice of curing agent. When the prepolymer method is employed, the prepolymer is preferably heated to a temperature which will be above the melting point of the curing agent and which will reduce the prepolymer viscosity to a few hundred or at most a few thousand contipoises so as to aid in mixing and prevent solidification of the curing agent. The curing agent is usually heated above its melting point also. The mixing of the prepolymer with curing agent is a critical step and the agitation should be excellent.

Similar or superior results can be obtained by the "one-step" method if the exotherm is properly controlled and if the relative rates of reactions of all components are adjusted to be nearly the same. Otherwise, a catalyst must be employed.

When processing any of the preferred thermoplastic urethanes, one must use care to keep the polymer dry such as below 0.1 percent water or hydrolysis of the polymer will occur during processing and both bubbling and property loss may occur.

The properties of the urethane are governed by a number of characteristics such as molecular weight, crosslinking, inter-molecular forces, a stiffness of chain units, the ease of rotation of chain segments and crystallizations. These variables can be changed, however, to design polymers with specific properties. The polyurethane or polyurethane-urea segments are believed to provide stiffness to the polymer and the polycarbonate and other polyol segments provide flexibility. The structuure and length of the hard segment may be controlled by the amount and type of diisocyanate and active hydrogen compound (curing agent) employed. Similarly, the structure and length of the flexible segment can be controlled by the molecular weight and type of hyroxyl-containing polycarbonate used.

The ratio of reactants can vary depending upon the materials employed and the intended use of the urethane but preferably the total number of labile or active hyrogen atoms is approximately equivalent to the number of isocyanate groups. The NCO to active or labile hydrogen ratio is generally from between about 0.9 and about 1.1.

After reaction is substantially complete, the polymer is preferably transferred directly to an extruder and extruded and/or milled and calendered to the desired thickness or the partially polymerized material can be further polymerized in the forming equipment. When it is not possible to make a direct transfer from the reaction apparatus to the forming apparatus, the polyurethane material can be poured into trays and the like and allowed to harden into blocks. The trays are preferably coated so that the polymer does not adhere to the tray or removal is sometimes difficult. Suitable coating materials are halogenated hydrocarbons such as Teflon; or Carnauba wax or a sheet material such as Tedlar can be draped in the tray. The polymer can then be processed when desired and where the processing requirement requires smaller pieces, the polymer is preferably cut while warm to permit the polymer to be more easily cut and cooled to make granulation easier. Conventional rubber mills and extruders can be employed to form the polymer into sheet form. The material is then preferably sandwiched between a nonadherent protecting material such as polyethylene to exclude dust and preferably sealed in a container to exclude moisture. It may be desirable to coat the polymer with a powder such as sodium bicarbonate in order to prevent adjacent sheets from adhering to each other. Before use in a laminate, it is desirable to control the moisture content in the polymer such as by drying in an oven at a temperature of between about room temperature and about 120° F. for from a few hours up to about 3 days or more. Before lamination, the powder, if employed, can be removed in a water bath and the sheet dried. The polyurethane can then be placed with other materials to form the desired laminate.

In some cases, an adhesion promoter may be necessary such as the alkoxy silanes. Suitable materials include: gama-aminopropyltriethoxysilane, sold by Union Carbide Corporation, under the tradename "A–1100" and by Dow Corning under the tradename "Z–6020"; and N-(beta-amino ethyl)gammaaminopropyltrimethoxysilane sold by Union Carbide Corporation under the tradename "A–1120". The promoter may be incorporated into the urethane reactants, applied externally to the sheet material, or preferably applied to the glass surface. In some cases, an adhesion controlling agent or inhibitor may be necessary such as the alkyl acid phosphates disclosed in Canadian Pat. No. 861,469. Particularly preferred is stearyl acid phosphate which has been observed to effect a desirable controlled adhesion with excellent diaphragm action and glass retention when a laminate is broken. It has been found that when laminates are prepared by the cast in place method generally an adhesion inhibitor is necessary as this method produces laminates in which the urethane is quite strongly adhered to the glass. A promoter may or may not be necessary depending upon the polymer employed when the polyurethane is extruded and/or calendered into a sheet such as when made by the "one-step" bulk polymerization method. The inhibitors are generally added to the urethane reactants although in some cases they may be coated on the sheet material or glass layer. Only a minor amount of adhesion controlling agent is required, if at all, such as from about 0.00001 to about 0.1 percent.

After the desired plies have been assembled, air can be removed and the laminate edges sealed by placing a rubber dam or channel around the edges of the laminate and pulling a partial vacuum and heating the laminate to the polyurethane softening temperature. The sealing can be accomplished in from between about 5 and about 10 minutes at a temperature of 300° F. and 10–25 p.s.i.g. The laminate can then be placed in an oil or an air autoclave until the laminate is sealed at a temperature of between about 275 and 350° F. for a period between about 45 minutes and 2 hours at 50 to 250 p.s.i.g. The autoclave conditions, however, will depend upon the particular polymers employed. In lieu of edge sealing and/or when the polyurethane is adhered to a single layer of glass and thus will be exposed to the oil in the autoclave, the laminate can be placed in a heat-resistant heat-sealable bag such as a polyethylene coated Mylar bag sold under the tradename "Polymar." The air can then be removed by pulling a vacuum which seals the bag, and the edge sealing step eliminated.

The perferred urethanes generally have inherent viscosities at 30° C. in 0.5 percent solution of silica stabilized chloroform or N-methyl-2-pyrrolidone of between about 0.3 and 3.0 and preferably between about 0.5 and about 1.5. The most preferred urethanes made from polyoxyalkylene carbonates, cycloaliphatic diisocyanates and aliphatic diols, generally fall within the preferred range.

The preferred urethanes of the invention can be characterized as plastomers, that is, they are elastopalstic and thus do not snap back as a true elastomer when stressed. In addition, they are clear, flexible and essentially nonadhesive at room temperature. They can also be described as being leathery and generally have a Gehman modulus between about $10^6$ and $10^{10}$ and preferably $10^{8.5}$ and $10^{9.1}$ dynes from 0° F. to 120° F., as mesured according to ASTM–D 1053–65.

The preferred polyurethanes of the invention will generally have an average molecular weight as calculated from inherent viscosity measurements between about 10,000 and about 100,000 and preferably between about 20,000 and 65,000. In addition, the optically clear urethanes upon heating will generally exhibit a low temperature endotherm at about 70° C. (differential thermal analysis can be made with a Dupont 900 thermal analyzer) and generally no endotherm or exotherm occurs between 100 and 170° C. indicating that the polymer is amorphous. Softening points of about 170° C., melting points of about 220 and decomposiiton at about 270° C. are typical. The preferred compositions suitable for use in automobile windshields meet the standard requirements of minimum light transmission of 70 percent and preferably 86.5 percent or above (Illument A, tungsten lamp, 2,840° K.) and less than 2 percent haze (ANSI Code Z–26.1, 1966, Test No. 18). The percent light transmission and percent haze can be measured by the Hunter pivotable sphere haze meter.

Although the compositions of the invention can be employed in laminates with other materials such as polyvinyl butyral, polycarbonate, and the like, this is not desirable because, as a general rule, for every added unlike material there is a decrease in the clarity and optical properties of the laminate. Further, the materials such as polycarbonate are extremely rigid such that concussive injury is more likely when multi-ply laminates are employed. Thus, a principal advantage of the invention is the discovery that particular polyurethanes can be employed as the sole or main interlayer between two glass surfaces or adhered to a single layer of glass to make a laminate having good optical properties and superior properties for minimizing human injury.

A method for preparing a trilayer is taught by Wismer et al., U.S. Pat. 3,509,015. By this method, two plies of glass which have been previously formed (if desired) are placed upon one another and spacers such as tape are placed around the perimeter. The glass plies are thus separated so that the liquid polymer can be poured between the plies to achieve the desired thickness and the urethane polymer cured. Preferably, however, the compositions of the invention are extruded and/or milled and calendered and applied between the glass surfaces in sheet form followed by a conventional heating step to obtain adhesion of the materials. If a bilayer is desired by the cast in place method, one layer of glass can be treated with a release agent such as a polysiloxane, Teflon and the like, and the layer removed after the other layer of glass and urethane are bonded together. Where the width of the interlayer is not critical, a bilayer can be prepared by spraying the liquid urethane polymer on a single layer of glass and heating the laminate. When it is desired to prepare a bilayer using the extruded and/or calendered material, a trilayer can be preferred in which one layer of glass is preferably treated with a release agent as above and one sheet of glass removed. A pressure plate of glass or like material also can be employed to adhere the urethane to a single sheet of glass.

The glass which can be employed in the invention can be of any type depending upon the intended use for the laminate but preferably is a clear, low colored, transparent type of glass including soda-lime, alumino-silicate, "Pyrex" and "Vycor," marketed by Corning Glass Works, tempered glasses such as "Herculite K," marketed by PPG Industries, Inc., and "Tufflex," marketed by Libbey-Owens-Ford Glass Company, chemically strengthened glasses, such as "Chemcor," marketed by Corning Glass Works, and "Z-Glass'" and "Herculite II," marketed by PPG Industries, Inc., and tinted glasses such as "Solex" marketed by PPG Industries, Inc., etc. The most preferred glasses, however, for use in safety glass laminates are the thin (approximately .065 inch) aforesaid chemically strengthened and tinted glasses.

In addition to automobile windshields, laminates can be prepared for use as windows in mass transit vehicles such as trains or for use in shower stalls, doors—both sliding and fixed—or any barrier particularly where accidents to humans or animals are possible.

For automobile and other vehicle windshields, the glass will preferably have a thickness of between about .065 inch and 0.180 inch. When a trilayer is employed, the outer layer can be thicker than the innerlayer but preferably they are the same or about ⅛ inch in thickness. Although the thickness of the interlayer can vary between about 5 mils and 120 mils or more, it is preferably between about 15 and about 45 mils for automobile windshields in order to obtain maximum transparency, low haze, and good diaphragm action when ruptured.

The following examples will serve to illustrate the invention and preferred embodiments. All parts and percentages in said examples are by weight unless indicated to the contrary.

EXAMPLE 1

Preparation of poly(oxyethylenecarbonate) glycol. Ethylene glycol (177.1 grams, 2.85 moles), ethylene carbonate (3519.8 grams, 40 moles) and potassium stannate catalyst (0.855 grams, 0.002857 mole) were charged to a 3-necked 5,000 milliliter round-bottomed flask fitted with a thermometer, motor driven Tru-Bore paddle stirrer and a bulb-type condenser at room temperature. The reaction was indicated by the evolution of carbon dioxide bubbles in a mineral oil bubbler. The reaction was conducted under atmospheric pressure with agitation under an atmosphere of pre-purified nitrogen at a temperature of 195° C. using a heating mantle. The reaction was conducted for 9½ hours when an infra-red analysis of a sample indicated less than 1 percent ethylene carbonate was present. The mixture was then placed under nitrogen for an additional 15 hours at room temperature. It was then heated to a temperature of about 90° C. and 0.6 milliliters of 85.6 percent phosphoric acid added to insolubilize the basic catalyst. The mixture was then cooled by means of an ice bath to 28° C. and 1428 milliliters of anhydrous methylene chloride and 10 grams of Powmenco asbestos added for the purpose of aiding filtration, and forced through a filter with nitrogen. The mixture was then heated at 100° C. with agitation at 5 milliliters of mercury pressure for about 7 hours to remove the solvent and then analyzed. The hydroxyl number was 140.5 and the polycarbonate contained 18.2 percent $CO_2$. The example was repeated but for the exception that 1.71 grams (0.005714 mole) of potassium stannate was employed as the catalyst. The resultant product was found to have a hydroxyl number of 140.5 and contained 20.7 percent $CO_2$. A mixture of the two poly(oxyethylenecarbonate) glycols was employed in the following Example 2.

EXAMPLE 2

The poly(oxyethylenecarbonate) glycol mixture of Example 1 having an average molecular weight of 799, a ratio of ether-to-carbonate linkages of 3.17:1, a hydroxyl number of 140.5 and 19.5 percent $CO_2$ was dried for 2½ hours at 105° C. under 5 millimeters of mercury pressure to remove trace amounts of water. The pressure was then released while introducing pre-purified nitrogen. To 618.4 grams (0.774 mole) of this material was then added anhydrous 1,4-butanediol (120.2 grams, 1.334 moles) over a 1 minute period at 85° C. while introducing pre-purified nitrogen. The temperature of the mixture dropped to 64° C. and 4,4'-methylene-bis-(cyclohexyl isocyanate) in a stereoisomer ratio of 55 percent trans and 45 percent cis (Hylene W) (553.1 grams, 2.108 moles) was rapidly added over a 2 minute period. The temperature of the mixture dropped to 50° C. The reactants were not completely miscible. The mixture was then heated to 100° C. whereupon it became miscible. The mixture was then degassed by heating for 8 minutes at a final temperature of 104° C. while gradually reducing the pressure to about 7 millimeters of mercury. The mixture was then poured into a 4-quart Teflon coated reaction pot and placed in a non-circulating oven under a nitrogen atmosphere and the temperature maintained at 130° C. for 20¼ hours. The temperature of the mixture was 143° C. The polymer was then found to contain 0.07 percent by weight NCO as determined by infra-red spectrometry and had an inherent viscosity at 30° C. at a 0.5 percent concentration in N-methyl-2-pyrrolidone of about 0.75. The resultant semi-solid polymer was allowed to cool to room temperature, removed, cut and milled (front roll 65° F. and rear roll 85° F.) and calendered on a 3 roll mill (top roll 155° F., middle roll 145° F. and bottom roll 125° F.) into 35 mil sheets 14 inches in width. The inherent viscosity after calendering was approximately the same or 0.70.

EXAMPLE 3

In accordance with the same general procedure of Example 2, poly(oxyethylenecarbonate) glycol, 1,4-butanediol and Hylene W were reacted in a mole ratio of 1 mole of poly(oxyethylenecarbonate) glycol to 1.315 moles of 1,4-butanediol to 2.315 moles of Hylene W. The poly(oxyethylenecarbonte) glycol was dried for 2½ hours at 110° C. and 3.5 millimeters mercury pressure and the butanediol rapidly added at 100° C. in a 1 minute period, with agitation. Two hours and thirty-three minutes later when the temperature of the mixture had dropped to 53° C., the Hylene W was added over a 2 minute period and the temperature dropped to 44° C. whereuon the mixture was not completely miscible. The mixture was heated up to 103° C. over a 43 minute period and the solution became miscible at 100° C. The mixture was degassed and poured into a pot and reacted at an oven temperature of 130° C. for 17 hours. The resultant polymer was clear, had an NCO content of 0.03 percent, and an inherent viscosity at 30° C. at a 0.5 percent concentration in N-methyl-2-pyrrolidone of about 0.65 both before milling (front roll 150° F., rear roll 70° F.) and after calendering (top roll 150° F., middle roll 135° F. and back roll 125° F.).

EXAMPLE 4

In accordance with the general procedure of Example 2, poly(oxyethylene carbonate) glycol, 1,4-butanediol and Hylene W were reacted in a mole ratio of 1:2.225 to 3.225. The polyethylene glycol carbonate was dried at 105° C. for 2 hours at 3 millimeters of mercury pressure and 3 hours later the butanediol was added at a temperature of 50° C. which addition required 1 minute and then the Hylene W was added over a 2 minute period and the temperature of the mixture dropped to 41° C. whereupon it was not completely miscible. The mixture was heated to 105° C. over a 40 minute period and it became miscible at 102° C. The mixture was then degassed for several minutes and reacted for 16.5 hours at an oven temperature of 130° C. The NCO content of the polymer was 0.03 percent. The inherent viscosity at 30° C. at 0.5 percent concentration in N-methyl-2-pyrrolidone was 0.93 before milling (front roll 190° F., rear roll 85° F.) and 0.82 after calendering (top roll 220° F., middle roll 210° F. and back roll 200° F.).

EXAMPLE 5

Preparation of poly(oxyethylenecarbonate) glycol

Ethylene glycol (62 grams, 1.0 mole), ethylene carbonate (1408 grams, 16.0 moles), and potassium carbonate catalyst (0.2764 gram, 0.002 mole) were charged to a 3-necked 3,000 milliliters round-bottomed flask fitted with a thermometer, motor driven Tru-Bore paddle stirrer and a bulb-type condenser at room temperature. The reaction was indicated by the evolution of carbon dioxide bubbles in a mineral oil bubbler. The reaction was conducted at atmospheric pressure under an atmosphere of pre-purified nitrogen at a temperature of 195° C. for 2½ hours using a heating mantle and then the mixture was gradually lowered to 150° C. over an additional 38 minutes. Phosphoric acid (85 percent, 0.27 milliliter, 0.004 mole) was then added to the mixture to insolubilize the basic catalyst and the mixture cooled to room temperature and maintained under a nitrogen atmosphere for approximately 68 hours. Infra-red spectrometry indicated the product contained 0.5 percent ethylene carbonate. To this mixture was then added 10 grams of Preco flock dried at 55° C. and 1 millimeter of mercury pressure and 500 milliliters of anhydrous methylene chloride previously dried with calcium hydride, to reduce the viscosity. The product was then filtered with nitrogen, the filtrate recycled twice through the filter bed, the entire filtrate again treated with 10 grams of Preco flock, filtered twice, and the methylene chloride was then removed from the mixture at atmospheric pressure by heating to a pot temperature of 165° C. The pressure was then lowered to 1 to 3 millimeters of mercury and the mixture was heated at 185° C. using a film evaporator to remove the remaining volatiles. The resultant polymer was found to have a hydroxyl number of 129.5, a $CO_2$ content of 11.8 and a molecular weight of 866. The polymer was employed in the following example.

EXAMPLE 6

The poly(oxyethylenecarbonate) glycol prepared in Example 5 was reacted with 1,4-butanediol and Hylene W in a mole ratio of 1.00 to 1.832 to 2.832. The polyoxyethylene carbonate was dried for 1 hour at 100° C. and 8 millimeters of mercury pressure and the butanediol added one-half hour later at a mixture temperature of 53° C. The temperature was raised to 75° C. over a 36 minute period and the Hylene W added over a 5 minute period whereupon the temperature of the mixture dropped to 60° C. The resultant mixture, which was not completely miscible, was then degassed by heating to 84° C. over a 25 minute period at a reduced pressure of up to 7 millimeters of mercury, and the solution became miscible at 80° C. The reaction pot was purged with nitrogen, covered and heated in a 130° C. non-circulating air oven for 66 hours. The NCO content was found to be nil and the polymer was milled (front roll 120° F., rear roll 65° F.) and calendered (top roll 155° F., middle roll 140° F., and back roll 130° F.) and had an inherent viscosity of 0.51 at 30° C. at a 0.5 percent concentration in chloroform.

Safety glass laminates were prepared employing as interlayers the compositions of Examples 2, 3, 4, 6 and a commercial polyvinyl butyral polymer. The laminates which measured 12 inches by 12 inches employed glass sheets having a thickness of ⅛-inch and were formed by placing the interlayers (30–43 mils) between two glass sheets and the laminates subjected to a temperature of 275°–350° F. and 200 p.s.i. for 45 minutes in an autoclave. Laminates were aged for one week at room temperature and then subjected to the impact resistance test. By this test, a five pound steel ball is dropped onto the laminate from various heights to determine the maximum height and speed at which the ball will just pass through or rupture the laminate. Separate laminates were used for each drop test. From previous work, the results of this test have been found to correlate closely with the results found from propelling cadavers into windshields. The test results are shown in the following Table I:

TABLE I

| Interlayer Example No. | Interlayer thickness, inches | Autoclave temperature (° F.) | Mean, 0° F. | Penetration, 70° F. | Velocity (m.p.h.) 120° F. |
|---|---|---|---|---|---|
| 2 | .043 | [1] 350 | Brittle | 14 | 25 |
| 3 | .040 | 275 | Brittle | 22 | 29, >32 |
| 4 | .033 | 275 | Brittle | 16 | 32 |
| 6 | .036 | 275 | Brittle | <37 | 23 |
| PVB | .030 | 275 | 16 | 24 | 13 |

[1] 125 p.s.i.

From the table, it can be seen that the compositions of the invention can be used effectively as interlayers. They are all considerably superior to the commercial polyvinyl butyral interlayer at 120° F. and the interlayer of Example 3 is nearly equivalent to PVB at 70° F. The ball drop results for the compositions at 0° F. are not reported because they are believed to be misleading when the interlayer is brittle, i.e., rigid, but interlayer compositions suitable for use at 0° F. can be prepared by employing polycarbonates of molecular weights between about 2,000 and 3,300 and/or by varying the concentration of reactants such as, for example, reducing the amount of low molecular weight active hydrogen compound.

The following examples are illustrative of other polycarbonate urethanes which can be employed.

EXAMPLE 7

In accordance with the general procedure of Example 2, 1 mole of poly(oxyethylenecarbonate) glycol (M.W. 866), 1.83 moles of 1,4-butanediol and 2.83 moles of Hylene W are rapidly mixed at 100° C. and then reacted in a Teflon-lined pan for 20 hours at 145° C. The resultant polymer is clear and tough.

EXAMPLE 8

In accordance with the general procedure of Example 2, 1 mole of poly(oxyethylenecarbonate) glycol (M.W. 799), 1.72 moles of 1,4-butanediol and 2.83 moles of Hylene W are rapidly mixed at 100° C. and then reacted in a Teflon-lined pan for 20 hours at 145° C. A clear polymer is formed.

EXAMPLE 9

In accordance with the general procedure of Example 2, 1 mole of poly(oxyethylenecarbonate) glycol carbonate (M.W. 779), 1.32 moles of 1,4-butanediol and 2.3 moles of Hylene W are mixed at 100° C. and then reacted in a Teflon-lined pan for 20 hours at 145° C. The polymer is clear and tough.

EXAMPLE 10

In accordance with the general procedure of Example 2, 1 mole of poly(oxyethylenecarbonate) glycol (M.W. 779), 2.23 moles of 1,4-butanediol and 3.23 moles of Hylene W are mixed at 100° C. and then reacted in a Teflon-lined pan for 20 hours at 145° C. The polymer is clear and tough.

EXAMPLE 11

In accordance with the general procedure of Example 2, 1 mole of poly(1,4-butylene adipate) glycol (M.W. 1965), 1.76 moles of poly(1,4-butylene adipate) glycol (M.W. 1010), 7.23 moles of poly(oxyethylenecarbonate) glycol (M.W. 779) and 9.99 moles of Hylene W are mixed at 100° C. and then reacted in a Teflon-lined pan for 20 hours at 145° C. The resultant polymer is clear and tough.

EXAMPLE 12

In accordance with the general procedure of Example 2, 1 mole of poly(oxyethylenecarbonate) glycol (M.W. 2400) and 1 mole of Hylene W are mixed at 100° C. and then reacted in a Teflon-lined pan at 145° C. for 20 hours. A clear, tough polymer is formed.

EXAMPLE 13

In accordance with the general procedure of Example 2, 1 mole of poly(oxyethylenecarbonate) glycol (M.W. 2400) and 1 mole of Hylene W are mixed at 100° C. and then reacted in a Teflon-lined pan for 20 hours at 145° C. The polymer is clear and tough.

EXAMPLE 14

In accordance with the general procedure of Example 2, 1 mole of poly(oxyethylenecarbonate) glycol (M.W. 2400) and 1 mole of methylene-bis-(4-phenyl isocyanate) are mixed at 100° C. and then reacted in a Teflon-lined pan for 20 hours at 145° C. A rubbery, clear polymer is formed.

EXAMPLE 15

In accordance with the general procedure of Example 2, 1 mole of poly(oxyethylenecarbonate) glycol (M.W. 866), 1.83 moles of 1,4-butanediol and 2.83 moles of toluene diisocyanate are mixed at 100° C. and then reacted in a Teflon-lined pan for 20 hours at 145° C. A clear and tough polymer is formed.

EXAMPLE 16

In accordance with the general procedure of Example 2, 1 mole of poly(oxyethylenecarbonate) glycol (M.W. 866), 1.83 moles of 1,4-butanediol, 1.41 moles of Hylene W and 1.42 moles of toluene diisocyanate are mixed at 100° C. and then reacted in a Teflon-lined pan for 20 hours at 145° C. A tough, clear polymer is formed.

Technical section

Laminate-destructive testing.—Ball drop results are commonly reported in the literature as the height from which the ball was dropped. In order to permit one to compare other results with the mean penetration velocities reported herein, the following table is provided. The table indicates the approximate distance from which the ball must be dropped to equal the miles per hour readings recorded herein.

| Feet: | M.p.h. |
|---|---|
| 6.5 | 14 |
| 8 | 15 |
| 9 | 16 |
| 10 | 17 |
| 11 | 18 |
| 12 | 19 |
| 13 | 20 |
| 15 | 21 |
| 16 | 22 |
| 17 | 23 |
| 19 | 24 |
| 20 | 24 |
| 21 | 25 |
| 22 | 26 |
| 24 | 27 |
| 26 | 28 |
| 28 | 29 |
| 30 | 30 |
| 32 | 31 |
| 34 | 32 |
| 36 | 33 |
| 38 | 34 |
| 40 | 35 |
| 43 | 36 |
| 45 | 37 |
| 48 | 38 |
| 50 | 39 |

NCO content of urethane.—Urethanes suitable for use in the invention are substantially completely reacted (i.e., the reaction and polyurethane formation is substantially complete) within the meaning of the specification and claims, when the urethane ingredients are heated at a temperature of 143° C. for 20 hours without a catalyst.

The procedure employed to determine the NCO content of the urethanes is as follows: a 0.5 gram sample of polyurethane was placed between two pieces of Tedlar polyethylene film cut in squares about 4 centimeters on a side and the composite placed in an oven for about 5 minutes at a temperature between about 160 and 170° C. until the urethane sample softened. The hot composite was then placed between the hot plates of a Pasadena Hydraulic Inc. Press, Model B–244, and 10 tons of pressure applied to the laminate. The urethane sample was then removed from the press and mounted in the beam of a Perkin-Elmer, Model 621, Spectrophotometer, and the beam traced from 2350 centimeters$^{-1}$ to 2000 centimeters$^{-1}$. A baseline was then drawn across the shoulders of the 2250 centimeters$^{-1}$ NCO band and the absorbance of the baseline at 2250 centimeters$^{-1}$ subtracted from the peak absorbance of the 2250 centimeters$^{-1}$ NCO band to determine the net absorbance of the NCO band. The percent NCO is then determined from the formula:

$$C = \frac{A}{a} \times D \times \frac{\text{Molecular Weight of NCO groups}}{\text{Molecular Weight of Diisocyanate}}$$

or 0.32 for Hylene W wherein

C = percent NCO
a = absorbance per 1 percent diisocyanate per millimeter thickness or 8.1 for Hylene W
A = net absorbance of the NCO band and
D = the film thickness Determination of $CO_2$ content.—A 2 gram sample is added to 50 milliliters of 10 percent alcoholic potassium hydroxide solution and the mixture heated in a flask fitted with an aid condenser for 2 hours on a steam bath at a temperature of 80° C. to effect complete saponification. The mixture is then cooled to room temperature and 4 to 6 drops of methyl orange indicator solution added. The mixture is then added to a flask fitted with: an absorber tower containing 40 milliliters of standard 1 normal sodium hydroxide; an acid reservoir containing 50 milliliters, 65 percent, sulfuric acid; and an aspirator pump so that a slow stream of $CO_2$—free air—passes through the system. Acid is then added dropwise from the reservoir to the reaction flask and the liberated carbon dioxide is absorbed in the absorption tower. When the sample mixture becomes acidic as shown by the indicator, the addition of acid is discontinued. The mixture is then heated just to the boiling temperature to expel carbon dioxide completely from the solution for about 5 minutes. The passage of $CO_2$—free air—is maintained through the system during the entire evolution process. The solution from the absorption tower is then transferred into the receiver flask, the tower rinsed free of sodium hydroxide with distilled water and the sodium hydroxide solution added to a 600 milliliter beaker and 50 milliliters of 10 percent barium chloride solution added. This solution is agitated for approximately 1 minute to precipitate barium carbonate completely. To this solution, without filtering, is then added 1 milliliter of phenolphthalein indicator solution and the excess sodium hydroxide titrated with standard 1 normal hydrochloric acid solution. The net milliliters of sodium hydroxide consumed is then determined and the percent $CO_2$ determined from the following calculation:

$$\text{Percent } CO_2 = \frac{\text{ml. NaOH} \times \text{Normality} \times 0.022 \times 100}{\text{sample weight}}$$

We claim:
1. An optically-clear, energy absorbing laminate, comprising at least one glass sheet bonded to a sheet of thermoplastic, transparent polycarbonate-based polyurethane, said polyurethane being the reaction product of (a) hydroxy-terminated, essentially linear aliphatic polycarbonate having

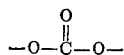

linkages and an average molecular weight between about 500 and about 5000, (b) diisocyanate, and (c) active hydrogen compound having a molecular weight of less than 250 and containing two active hydrogens per molecule reactive with isocyanate groups, the mole ratio of (c) to (a) being from about 0.2:1 to about 12:1, the ratio of (b) to (a) plus (c) being such that said polyurethane is substantially free of isocyanate groups.

2. The laminate of claim 1 wherein the urethane is sandwiched between two sheets of glass.
3. The laminate of claim 1 wherein (a) is an essentially linear aliphatic polycarbonate having ether linkages in a ratio of ether-to-carbonate linkages of about 3 to about 6:1.
4. The laminate of claim 1 wherein (b) is an aliphatic or cycloaliphatic diisocyanate.
5. The laminate of claim 4 wherein (b) is a dinuclear cycloaliphatic diisocyanate.
6. The laminate of claim 5 wherein (b) is 4,4'-methylene-bis-(cyclohexyl isocyanate).
7. The laminate of claim 6 wherein (b) is 4,4'-methylene-bis-(cyclohexyl isocyanate) in a stereoisomer ratio of 55 percent trans and 45 percent cis.
8. The laminate of claim 1 wherein (c) is 1,4-butanediol.
9. The laminate of claim 1 wherein the polycarbonate has an average molecular weight of about 1000 and the ratio of (c) to (a) is between about 0.5:1 and about 1.2:1.
10. The laminate of claim 1 wherein the polycarbonate has an average molecular weight of about 2000 and the ratio of (c) to (a) is between about 0.5:1 and about 5:1.
11. The laminate of claim 1 wherein the polycarbonate has an average molecular weight of about 3300 and the ratio of (c) to (a) is between about 1:1 and about 10:1.
12. The laminated of claim 1 wherein the polycarbonate has an average molecular weight of from 750 to 3300.
13. The laminate of claim 1 wherein the polyurethane is a random polymer.
14. The laminate of claim 1 wherein the polycarbonate is free of ether linkages.
15. The laminate of claim 1 wherein the polycarbonate is a polyoxyalkylene carbonate wherein the repeating alkylene oxide units of the polycarbonate contain from 2 to 5 carbon atoms.
16. The laminate of claim 15 wherein the polycarbonate is an essentially linear aliphatic polycarbonate having ether linkages in a ratio of ether-to-carbonate linkages of from about 2 to about 10:1.
17. The laminate of claim 1 wherein (c) is an aliphatic diol of from 2 to 15 carbon atoms.
18. The laminate of claim 17 wherein the aliphatic diol contains the hydroxyl groups in a terminal position.
19. An optically-clear, energy absorbing laminate, comprising at least one glass sheet bonded to a sheet of thermoplastic, transparent polycarbonate-based polyurethane, said polyurethane being the reaction product of (a) hydroxy-terminated, essentially linear aliphatic polycarbonate having

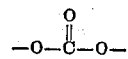

linkages and an average molecular weight between 500 and 5000, (b) aliphatic or cycloaliphatic diisocyanate, and (c) aliphatic diol of from 2 to 15 carbon atoms, the mole ratio of (c) to (a) being from about 0.2:1 to about 12:1, and the ratio of (b) to (a) plus (c) being such that said polyurethane is substantially free of isocyanate groups.
20. The laminate of claim 19 wherein (b) is a dinuclear cycloaliphatic diisocyanate.
21. The laminate of claim 19 wherein (b) is 4,4'-methylene-bis-(cyclohexyl isocyanate).
22. The laminate of claim 19 wherein (b) is 4,4'-methylene-bis-(cyclohexyl isocyanate) in a stereoisomer ratio of 55 percent trans and 45 percent cis.
23. The laminate of claim 22 wherein (c) is 1,4-butanediol.
24. The laminate of claim 19 wherein the polycarbonate has a molecular weight of from 750 to 3300.

25. The laminate of claim 19 wherein the polycarbonate is free of ether linkages.

26. The laminate of claim 19 wherein the polyurethane is bonded to two sheets of glass.

27. An optically clear, safety glass laminate having an interlayer of thermoplastic, transparent polycarbonate-based polyurethane, said polyurethane being the reaction product of (a) hydroxy-terminated, essentially linear aliphatic polycarbonate having

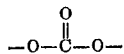

linkages and an average molecular weight between 750 and 3300, (b) dinuclear cycloaliphatic diisocyanate, and (c) aliphatic diol having a molecular weight between 62 and 250, the mole ratio of (c) to (a) being from 0.2:1 to 12:1, and the ratio of (b) to (a) plus (c) being such that said polyurethane is substantially free of isocyanate groups.

28. The laminate of claim 27 wherein (b) is 4,4'-methylene-bis-(cyclohexyl isocyanate) and (c) is 1,4-butanediol.

29. The laminate of claim 28 wherein the polycarbonate is free of ether groups.

30. An optically clear, laminated glass article comprising a glass sheet having bonded thereto an adherent layer of a polyurethane reaction product of (a) hydroxy-terminated, essentially linear aliphatic polycarbonate having

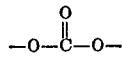

linkages, an average molecular weight of between about 750 and about 3300, and being free of ether groups, (b) dinuclear cycloaliphatic diisocyanate and (c) aliphatic diol having a molecular weight between 62 and 250, the mole ratio of (c) to (a) being from about 0.2:1 to about 12:1, and the ratio of (b) to (a) plus (c) being such that said polyurethane is substantially free of isocyanate groups.

31. The glass article of claim 30 wherein (b) is 4,4'-methylene-bis-(cyclohexyl isocyanate) and (c) is 1,4-butanediol.

References Cited
UNITED STATES PATENTS

| | | | |
|---|---|---|---|
| 3,639,354 | 2/1972 | Müller | 260—77.5 A P |
| 3,509,015 | 4/1970 | Wismer et al. | 161—190 |
| 3,526,572 | 9/1970 | Finelli | 161—183 |
| 3,214,489 | 10/1965 | Park | 260—858 |
| 3,379,693 | 4/1968 | Hostettler | 260—77.5 A P |

DANIEL J. FRITSCH, Primary Examiner

U.S. Cl. X.R.

161—190, 192; 260—47 CB, 77.5 AP, 858